(12) United States Patent
Park et al.

(10) Patent No.: US 10,801,851 B2
(45) Date of Patent: Oct. 13, 2020

(54) NAVIGATION APPARATUS, VEHICLE INCLUDING THE SAME, AND METHOD OF CONTROLLING THE VEHICLE

(71) Applicants: HYUNDAI MOTOR COMPANY, Seoul (KR); KIA MOTORS CORPORATION, Seoul (KR); HYUNDAI MNSOFT, INC., Seoul (KR)

(72) Inventors: Kangwon Park, Hwaseong-si (KR); Soyun Park, Seoul (KR); Dong Hun Lee, Seoul (KR)

(73) Assignees: HYUNDAI MOTOR COMPANY, Seoul (KR); KIA MOTORS CORPORATION, Seoul (KR); HYUNDAI MNSOFT, INC., Seoul (KR)

( * ) Notice: Subject to any disclaimer, the term of this patent is extended or adjusted under 35 U.S.C. 154(b) by 290 days.

(21) Appl. No.: 15/724,463

(22) Filed: Oct. 4, 2017

(65) Prior Publication Data

US 2018/0100745 A1 Apr. 12, 2018

(30) Foreign Application Priority Data

Oct. 11, 2016 (KR) ........................ 10-2016-0131216

(51) Int. Cl.
  *G01C 21/34* (2006.01)
  *G08G 1/0967* (2006.01)
  *G08G 1/01* (2006.01)

(52) U.S. Cl.
  CPC ......... *G01C 21/3492* (2013.01); *G08G 1/012* (2013.01); *G08G 1/0133* (2013.01); *G08G 1/09675* (2013.01); *G08G 1/096708* (2013.01); *G08G 1/096716* (2013.01); *G08G 1/096775* (2013.01); *B60W 2556/50* (2020.02)

(58) Field of Classification Search
  CPC .. G01C 21/3492; G08G 1/012; G08G 1/0133; G08G 1/096775; B60W 2556/50
  USPC .................................................. 701/118, 119
  See application file for complete search history.

(56) References Cited

U.S. PATENT DOCUMENTS

| | | | |
|---|---|---|---|
| 2008/0059051 A1* | 3/2008 | Kumagai | G08G 1/0104 701/117 |
| 2009/0292456 A1* | 11/2009 | Inoguchi | G09B 29/007 701/118 |
| 2014/0067187 A1 | 3/2014 | Ferguson et al. | |
| 2015/0262480 A1* | 9/2015 | Fowe | G01C 21/3492 701/117 |

(Continued)

FOREIGN PATENT DOCUMENTS

| | | |
|---|---|---|
| JP | 2004-77335 A | 3/2004 |
| JP | 2007-114128 A | 5/2007 |
| JP | 2009-134529 A | 6/2009 |

(Continued)

*Primary Examiner* — Isaac G Smith
(74) *Attorney, Agent, or Firm* — McDonnell Boehnen Hulbert & Berghoff LLP

(57) ABSTRACT

Disclosed herein is a navigation apparatus that includes a receiver and a controller. The receiver may receive a plurality of events related to traffic information. The controller may be configured to generate an integrated event by processing the plurality of events when the plurality of events overlap or are consecutive events. The controller may calculate an average speed of the integrated event.

17 Claims, 12 Drawing Sheets

(56) References Cited

U.S. PATENT DOCUMENTS

2016/0379489 A1* 12/2016 MacFarlane ......... G08G 1/0129
701/119

FOREIGN PATENT DOCUMENTS

| KR | 10-2009-0036516 A | 4/2009 |
| KR | 10-1063201 B1 | 9/2011 |
| KR | 10-1204422 B1 | 11/2012 |
| KR | 10-1475040 B1 | 12/2014 |

* cited by examiner

NAVIGATION APPARATUS, VEHICLE INCLUDING THE SAME, AND METHOD OF CONTROLLING THE VEHICLE

CROSS-REFERENCE TO RELATED APPLICATION

This application claims the benefit of Korean Patent Application No. 10-2016-0131216, filed on Oct. 11, 2016 in the Korean Intellectual Property Office, the disclosure of which is incorporated herein by reference.

BACKGROUND

1. Field

Embodiments of the present disclosure relate to a navigation apparatus, a vehicle including the navigation apparatus, and a method of controlling the vehicle.

2. Description of the Related Art

A navigation apparatus performs navigation functions in a vehicle and additionally performs functions of audio, video, content playback, Internet search, calling, short message transmitting and receiving, position detection, and the like.

When performing the navigation function, a navigation apparatus calculates a current position by receiving position information from satellites through a plurality of global positioning systems (hereinafter, referred to as GPSs), when a destination is input by a user, displays the current position on a map by matching the current position with the map, determines a path from the current position to the destination according to a path detecting algorithm, displays the determined path on the map by matching the determined path with the map, and guides the path from the current position to the destination using the path.

The disclosure of this section is to provide background of the invention. Applicant notes that this section may contain information available before this application. However, by providing this section, Applicant does not admit that any information contained in this section constitutes prior art.

SUMMARY

An aspect of the present disclosure provides a navigation apparatus configured to generate an integrated event by processing a plurality of overlapping or sequential events, a vehicle including the navigation apparatus, and a method of controlling the vehicle. Additional aspects of the present disclosure will be set forth in part in the description which follows and, in part, will be obvious from the description, or may be learned by practice of the present disclosure.

In accordance with one aspect of the present disclosure, a navigation apparatus may include a receiver and a controller. The receiver may be configured to receive a plurality of events related to traffic information, and the controller may be configured to generate an integrated event by processing the plurality of events when the plurality of events overlap or are consecutive events. The controller may calculate an average speed of the integrated event.

The plurality of events may include a first event and a second event. When an end point of the first event coincides with a starting point of the second event, the controller may determine that the first event and the second event are consecutive events.

The plurality of events may include a first event and a second event. When an end point of the first event is positioned after a starting point of the second event, the controller may determine that the events overlap each other.

The plurality of events may include a first event and a second event. When the first event is included in the second event, the controller may determine that the whole first event overlaps the second event.

When the plurality of events are consecutive events, the controller may calculate the average speed of the integrated event by summing average speeds of the plurality of events in proportion to a distance of each of the events.

When the plurality of events overlap, the controller may calculate the average speed of the integrated event by summing average speeds of events with low average speeds among the plurality of events in proportion to a distance of an overlapping section, for the overlapping section and summing average speeds of the events in proportion to a distance of a non-overlapping section of each of the events, for the non-overlapping section of each of the plurality of events.

When the entire first event overlaps the second event, the controller may calculate an average speed of the second event to be the average speed of the integrated event.

The navigation apparatus may further include a storage in which speed limit information for each link of a road is stored. When the entire first event overlaps the second event, the controller may calculate the average speed of the integrated event by summing an average speed of the first event in proportion to a distance of an overlapping section of the second event, for the overlapping section and the speed limit stored in the storage in proportion to a distance of a non-overlapping section of the second event, for the non-overlapping section.

The controller may calculate a distance of the integrated event.

When the plurality of events are consecutive events, the controller may calculate a sum of distances of the plurality of events as the distance of the integrated event.

The plurality of events may include a first event and a second event, and when an end point of the first event is positioned after a starting point of the second event and a starting point of the first event is positioned before the starting point of the second event, the controller may calculate a distance between the starting point of the first event to an end point of the second event as the distance of the integrated event.

The plurality of events may include a first event and a second event. When the first event is included in the second event, the controller may calculate a distance of the second event as the distance of the integrated event.

The controller may calculate a delayed driving time caused by the integrated event based on the average speed of the integrated event and the distance of the integrated event.

The controller may determine a plurality of events having preset event properties to be objects for processing and may generate an integrated event for the plurality of events which are objects for processing.

In accordance with another aspect of the present disclosure, a vehicle includes a receiver and a controller. The receiver may be configured to receive a plurality of events related to traffic information. The controller may be configured to generate an integrated event by processing the plurality of events when the plurality of events overlap or are consecutive events. The controller may calculate an average speed of the integrated event.

In accordance with another aspect of the present disclosure, a method of controlling a vehicle includes: receiving a plurality of events related to traffic information, generating an integrated event by processing the plurality of events when the plurality of events overlap or are consecutive events; and calculating an average speed of the integrated event.

When the plurality of events are consecutive events, the calculating of the average speed of the integrated event may include calculating an average speed by summing average speeds of the plurality of events in proportion to a distance of each of the events.

When the plurality of events overlap, the calculating of the average speed of the integrated event may include calculating an average speed by summing average speeds of events with low average speeds among the plurality of events in proportion to a distance of an overlapping section, for the overlapping section and summing average speeds of the events in proportion to a distance of a non-overlapping section of each of the events, for the non-overlapping section of each of the plurality of events.

The method may further include calculating a distance of the integrated event before the calculating of the average speed of the integrated event.

The method may further include determining a plurality of events having preset event properties as objects for processing before the generating of the integrated event. The generating of the integrated event may include generating an integrated event for the plurality of events which are the objects for processing.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
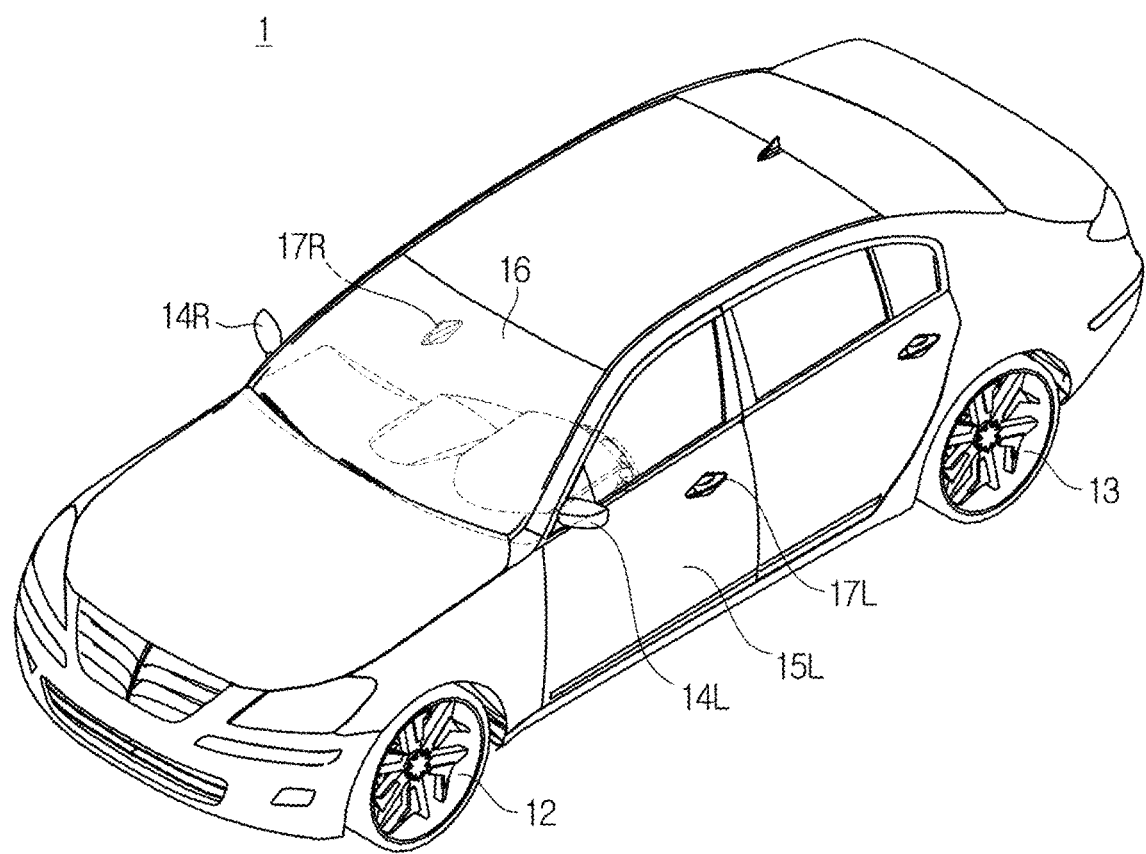
FIG. 1 is an exterior view of a vehicle according to one embodiment.

Hereinafter, exemplary embodiments of the present disclosure will be described in detail with reference to the accompanying drawings. Additional objects, features and operational advantages, including the object, constitution and effects of the present disclosure, will become more apparent from the detailed description of the preferred embodiments. In this specification, when reference numerals are assigned to components of each drawing, it should be noted that, although the same components are illustrated in different drawings, the same numerals are assigned as much as possible. Further, in the following description of the present disclosure, a detailed description of known functions and configurations incorporated herein will be omitted when it may make the subject matter of the present disclosure unnecessarily unclear. It will be understood that, although the terms "first," "second," etc. may be used herein to describe various components, these components should not be limited by these terms.

An aspect of the present disclosure provides a method for providing an estimated travel time on a scheduled driving route of a vehicle using information on multiple traffic events on the driving route. A computerized controller installed in the vehicle obtains information on traffic events on the driving route, compute expected driving speeds for sections (or segments) of the driving route a head of the vehicle using the traffic event information, and computed an expected delay or an expected travel time to the destination on the scheduled driving route. In embodiments, the controller causes a display of the vehicle to display information of the traffic event and the computed delay or travel time.

In embodiments, the computerized controller receives, using a wireless communication with a remote computing device, information of multiple events that can delay traffic on the driving route ahead. In embodiments, for each of the events, the received information includes at least one from information indicating start and end of an individual event on the driving route, a type of the individual event, and an expected driving speed under the individual event.

In embodiments, for a first section of the driving route that is associated with no event, the controller computes a first expected driving speed in the section using a first predetermined speed limit of the first section and/or a current traffic speed in the first section.

In embodiments, for a second section of the driving route that is associated with a single event, the controller determines a second expected driving speed in the second section using at least one from a second predetermined speed (or speed limit) of the second section, a current traffic speed in the second section, a predetermined traffic speed under the single event. In embodiments, the second expected driving speed is computed by applying a traffic delay factor smaller than 1 to a predetermined speed of the second section.

In embodiments, for a third section of the driving route that is associated with two or more (overlapping) events, the controller determines a third expected driving speed in the third section using at least one from a third predetermined speed (or speed limit) of the third section, a current traffic speed in the third section, and predetermined traffic speeds of the two or more events. In embodiments, when the two or more events have different impacts on the traffic speed, the controller selects a particular event from the two or more events and computes the third expected driving speed considering the selected single event without considering impacts of the other events. In embodiments, in selecting the particular event, the controller selects an event that would delay the traffic most significantly among the two or more overlapping events (assuming the third section is associated with only one event. In embodiments, the controller uses a predetermined traffic speed of the selected particular event as the third expected driving speed of the third section.

Figure 2:
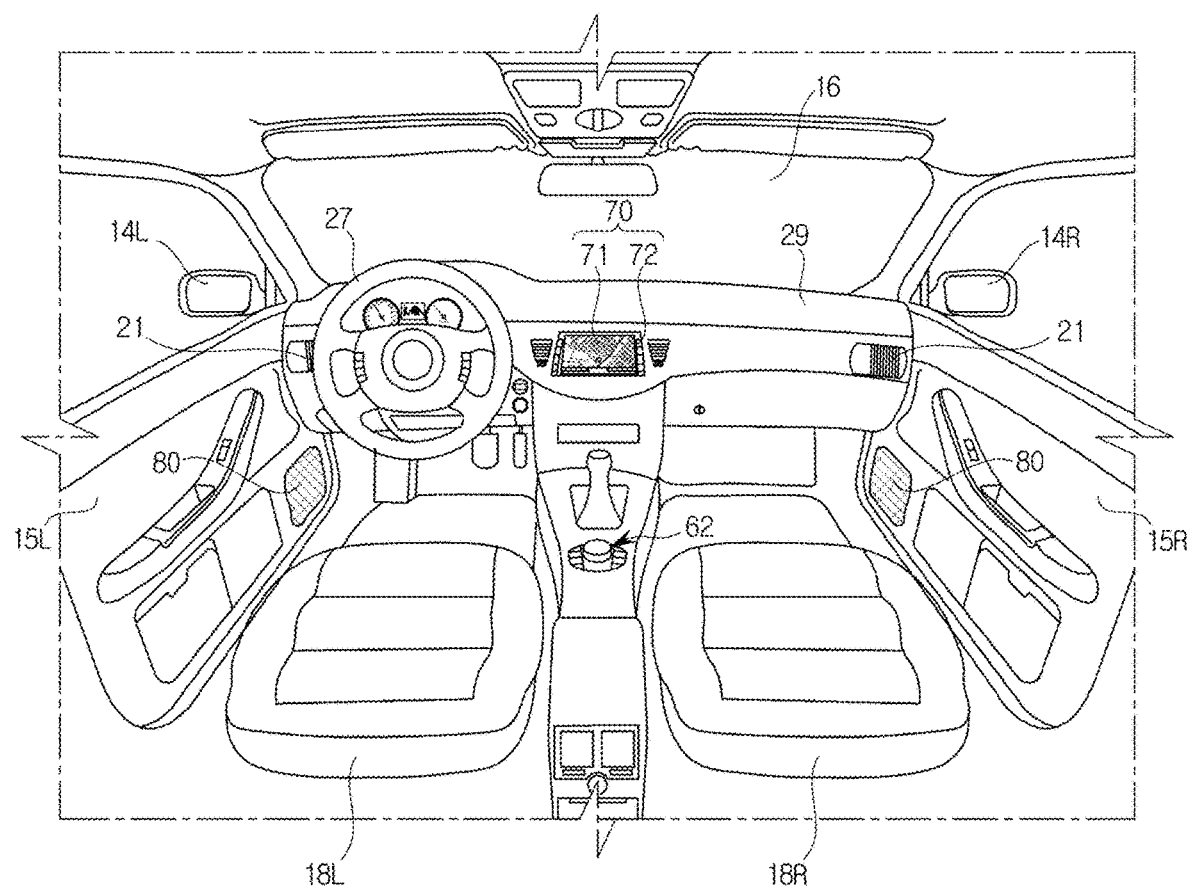
FIG. 2 is a view illustrating an internal configuration of a vehicle according to one embodiment.

FIG. 1 is an exterior view of a vehicle according to one embodiment, and FIG. 2 is a view illustrating an internal configuration of a vehicle according to one embodiment.

Referring to FIG. 1, an exterior of a vehicle 1 according to one embodiment includes wheels 12 and 13 which move the vehicle 1, doors 15L which shield the inside of the vehicle 1 from the outside, a front glass 16 which provides a view ahead of the vehicle 1 to a driver inside the vehicle 1, and side mirrors 14L and 14R which provide a view behind the vehicle 1 to the driver.

The wheels 12 and 13 include front wheels 12 provided in the front of the vehicle 1 and rear wheels 13 provided in the rear of the vehicle 1, and a driving device provided inside the vehicle 1 provides rotatory power to the front wheels 12 or the rear wheels 13 so that the vehicle 1 moves forward or backward. Such a driving device may adopt an engine which generates the rotatory power by burning a fossil fuel or a motor which generates the rotatory power by receiving a power source from an electric condenser.

The doors 15L and 15R (see FIG. 2) are rotatably provided at left and right sides of the vehicle 1, and a driver or passenger may enter into the vehicle 1 when the door 15L or 15R is open, and the inside of the vehicle 1 is shielded from the outside when the doors 15L and 15R are closed. Further, handles 17L and 17R capable of opening and closing the doors 15L and 15R (see FIG. 2) may be provided at outer sides of the vehicle 1.

The front glass 16 is provided on a forward top side of the body so that the driver inside the vehicle 1 may obtain visual information ahead of the vehicle 1, and the front glass 16 is also referred to as a windshield glass.

Further, the side mirrors 14L and 14R include a left side mirror 14L provided on the left side of the vehicle 1 and a right side mirror 14R provided on the right side thereof so that the driver inside the vehicle 1 may obtain visual information in lateral and rearward directions of the vehicle 1.

In addition, the vehicle 1 may include sensors such as a proximity sensor which senses obstacles or other vehicles behind or beside the vehicle 1, a rain sensor which senses rainfall and an amount of the rainfall, etc.

The proximity sensor may transmit a sense signal from a lateral or rear surface of the vehicle, and may receive a reflected signal reflected from an obstacle such as another vehicle or the like. Whether the obstacle exists at beside or behind the vehicle 1 may be sensed and a location of the obstacle may be detected on the basis of a waveform of the received reflected signal. As an example of such a proximity sensor, a method of emitting ultrasonic waves or infrared rays and calculating a distance up to an obstacle using the ultrasonic waves or infrared rays reflected from the obstacle may be adopted.

Referring to FIG. 2, a navigation apparatus 70 may be provide in a central region of a dashboard 29. The navigation apparatus 70 may be implemented as an audio video navigation (AVN) apparatus supporting not only a navigation system but also an audio system and a video system, and may include AVN display 71 and an AVN input unit 61.

The AVN display 71 may selectively display at least one of an audio screen, a video screen, and a navigation screen and, in addition, may display various types of control screens associated with the vehicle 1 or screens associated with additional functions.

The AVN display 71 may be implemented as a liquid crystal display (LCD), a light emitting diode (LED), a plasma display panel (PDP), an organic LED (OLED), a cathode ray tube (CRT), etc.

The AVN input unit 61 may be provided in a region adjacent to the AVN display 71 in a hard key type, or when the AVN display 71 is implemented as a touch screen type, a front surface of the AVN display 71 may be provided in a touch panel form.

Further, a center input unit 62 in a jog shuttle type may be provided between a driver's seat 18L and a passenger's seat 18R. A user may input a control command by rotating or pressing the center input unit 62 or by pushing the center input unit 62 in a vertical or lateral direction.

A sound output unit 80 capable of outputting sound may be provided in the vehicle 1, and the sound output unit 80 may be a speaker. The sound output unit 80 may output sound needed for performing an audio function, a video function, a navigation function, and other additional functions.

A steering wheel 27 is provided at the dashboard 29 in front of the driver's seat 18L.

Meanwhile, an air conditioning device is provided in the vehicle 1 to perform both heating and cooling, and temperature inside the vehicle 1 may be controlled by discharging heated or cooled air through an air opening 21.

Figure 3:
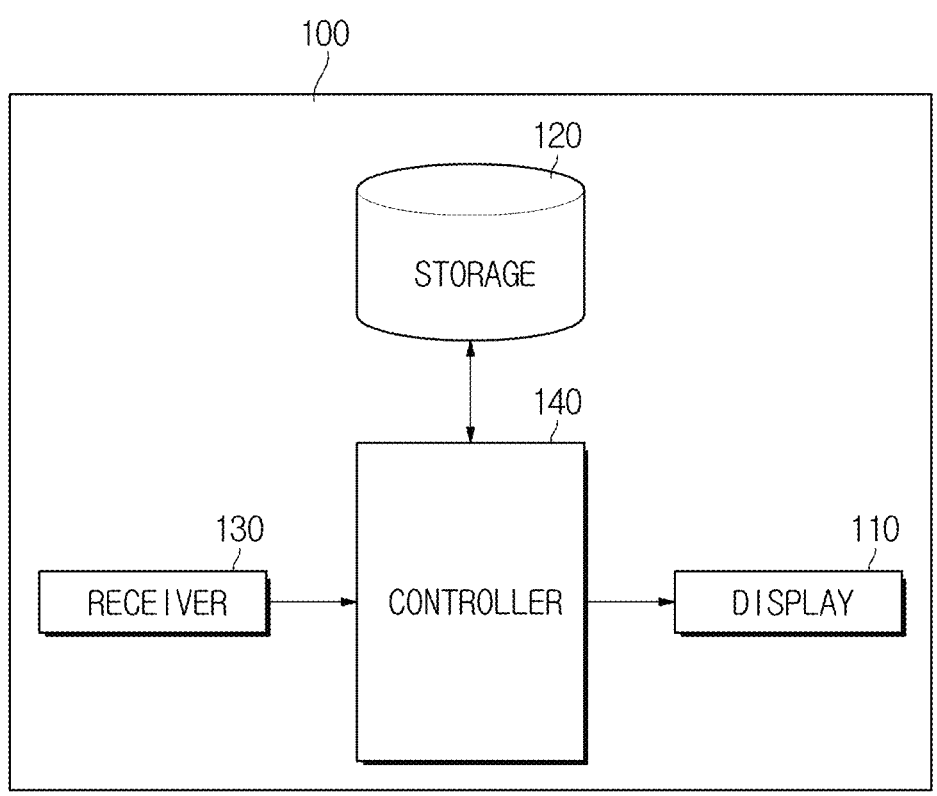
FIG. 3 is a control block diagram of a navigation apparatus included in a vehicle in accordance with one embodiment. The navigation apparatus 100 may be embodied as the navigation apparatus 70 shown in FIG. 2.

FIG. 3 is a control block diagram of a navigation apparatus included in a vehicle in accordance with one embodiment. The navigation apparatus 100 may be embodied as the navigation apparatus 70 shown in FIG. 2.

Referring to FIG. 3, a navigation apparatus 100 in accordance with one embodiment includes a display 110 configured to display a screen to a user, a storage 120 in which a program or data is stored, a receiver 130 configured to receive wireless signals, and a controller 140 configured to operate components of the navigation apparatus 100.

When the vehicle 1 is being driven on the road, the display 110 may visually display various pieces of traffic information such as a current driving road, a detected path, congestion on the road, and the like.

Also, the display 110 may display a driving direction of the vehicle, a distance to a destination, current driving speed of the vehicle, an optimal path to the destination, and the like, thus displaying various pieces of information necessary for driving.

The display 110 in accordance with one embodiment may display one or more events related to traffic information according to a control signal of the controller 150.

An event is traffic information with respect to a particular section of a road and may include information with respect to a starting point, a distance, or an end point. For example, an event may include a first event which indicates a "congestion" state, in which average speed is 10 km/h while passing a 5 km section starting from a point (a starting point) that is 10 m from a current position of the vehicle 1, a second event which indicates an "under construction" state for passing a 1 km section starting from a point that is 1 km from the current position of the vehicle 1, and a third event which indicates a "delayed" state in which average speed of a section from a point 20 km from the current position of the vehicle 1 to an end point 27 km therefrom is 40 km/h, and the like. Hereinafter, for convenience of description, an event including information with respect to a starting point and a distance will be described as an example. In this case, the controller 140 which will be described below may determine an end point of an event based on information with respect to the starting point and the distance of the event.

The display 110 in accordance with one embodiment may display information with respect to a starting point and a distance of each event, an average speed of each event, a delayed driving time caused by each event, and the like.

The display 110 may be embodied as the AVN display 71 described above with reference to FIG. 2.

The display 110 may be provided as a cathode ray tube (CRT), a digital light processing (DLP) panel, a plasma display panel, a liquid crystal display (LCD) panel, an electroluminescence (EL) panel, an electrophoretic display (EPD) panel, an electrochromic display (ECD) panel, a light emitting diode (LED) panel, an organic LED (OLED) panel or the like but is not limited thereto.

The screen displayed by the display 110 will be described below.

The storage 120 stores map data.

The map data includes speed limit information for each link which breaks up and organizes the road into certain units.

Also, the storage 120 may include a data area in which raw data of an event received from outside is stored, a data area in which an event decoded by the controller 140 is stored, and a data area in which events processed by the controller are stored.

Figure 11:
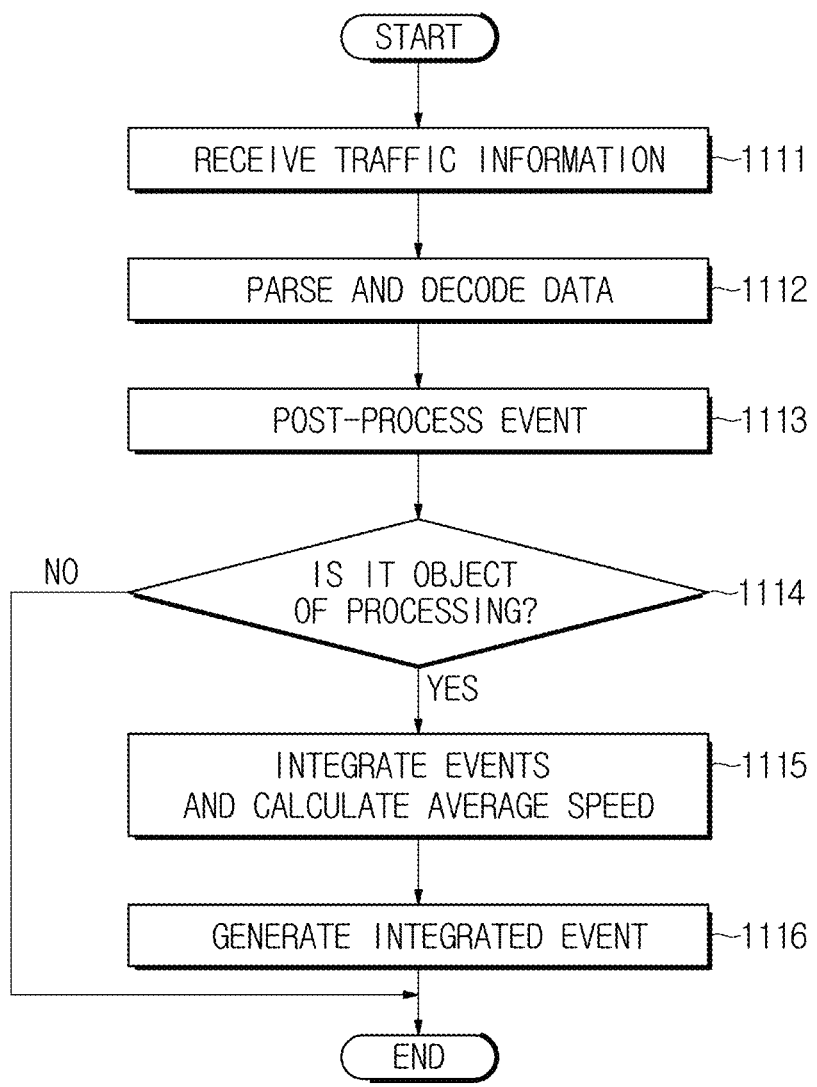
FIG. 11 is a flowchart of a method of controlling a navigation apparatus in accordance with one embodiment.

The data stored in each of the data areas will be described below with reference to FIG. 11.

The storage 120 may be embodied as at least one of a nonvolatile memory device such as a cache, a read-only memory (ROM), an erasable programmable ROM (EPROM), an electrically erasable programmable ROM (EEPROM), and a flash memory, a volatile memory such as random-access memory (RAM), and a storage medium such as a hard disk drive (HDD) and a compact disc ROM (CD-ROM) but is not limited thereto. The storage 120 may be a memory embodied as a chip separate from a processor of the controller 140 and may be a single chip integrated with the processor.

The receiver 130 receives a plurality of events related to traffic information from outside such as a traffic control center, a server, or the like through a wireless communication network. The events received from outside are raw data which is not decoded or processed yet to be data-processed by the controller 140 which will be described below.

The receiver 130 may receive a plurality of events with starting points or end points within a preset distance from on a current position of the vehicle 1.

The receiver 130 may include a wireless communication interface including an antenna or a receiver configured to receive wireless signals. Also, the receiver 130 may further include a wireless signal converting module configured to demodulate a wireless signal in an analog form received through the wireless communication interface into a digital control signal.

A wireless communication receiving method may include various well-known wireless communication methods such as wireless fidelity (Wi-Fi), wireless broadband, a global system for mobile communication (GSM), code division multiple access (CDMA), wideband CDMA (WCDMA), universal mobile telecommunication system (UMTS), time division multiple access (TDMA), long term evolution (LTE), and the like.

The receiver 130 may further include a global positioning system (GPS) module configured to GPS information for determining the current position of the vehicle 1.

The controller 140 controls each component included in the navigation apparatus 100.

The controller 140 includes a memory configured to store algorithms for controlling operations of the components in the navigation apparatus 100 or data of programs executing the algorithms and a processor configured to perform the operations described above using the data stored in the memory. Here, the memory and the processor may be embodied as separate chips. Also, the memory and the processor may be embodied as a single chip.

The controller 140 may determine the current position of the vehicle 1 based on the GPS information received by the receiver 130. Since a method, by the controller 140, of determining a current position based on GPS information, is a well-known technology, a detailed description thereof will be omitted.

The controller 140 may store raw data of the plurality of events received by the receiver 130 in any one data area of the storage 120 and may parse decode according to specifications of the navigation apparatus 100. Also, the controller 140 performs post-processing for transferring a plurality of decoded events to another data area of the storage 120.

Figure 4:
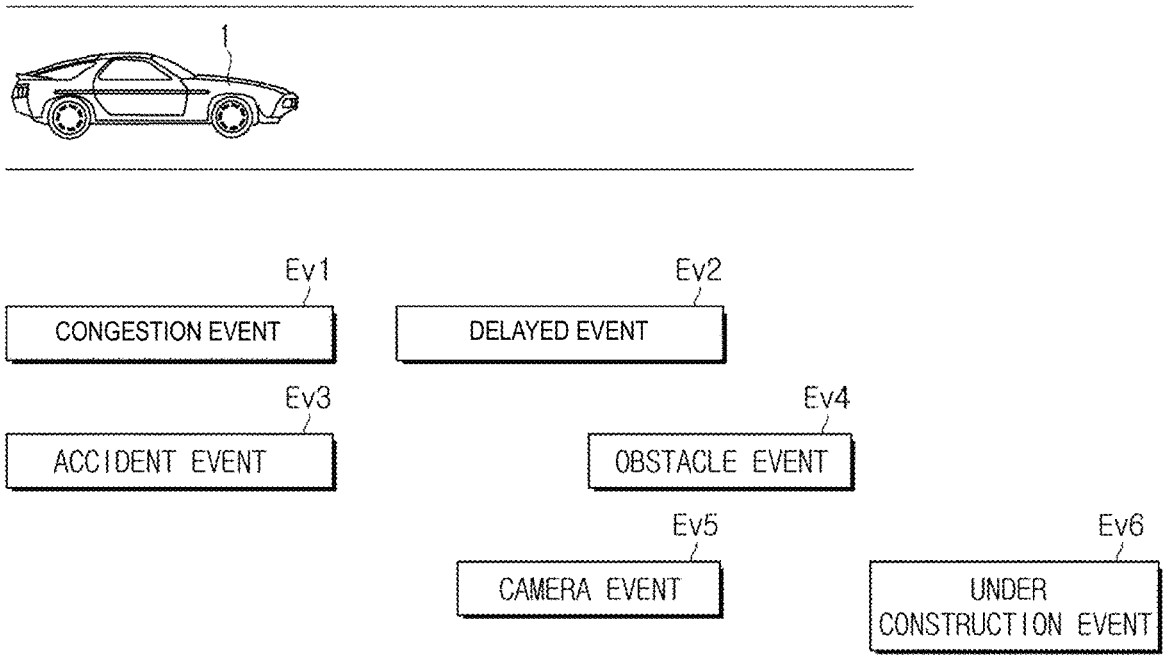
FIG. 4 is a view illustrating an example of a plurality of events having various event properties.

Also, the controller 140 selects events which are objects for processing among the events stored in the other data area. FIG. 4 is a view illustrating an example of a plurality of events having various event properties.

Referring to FIG. 4, the plurality of events received from outside may include events Ev1 and Ev2 having properties related to driving speed change, such as congestion or a delay, events Ev3 and Ev6 having properties related to unexpected accident points, such as events indicating an accident or construction area, and events Ev4 and Ev5 having properties related to structures existing on the road such as obstacles or cameras, and the like. References for classifying event properties may be preset by the controller 140 and are not limited to the above example.

The events which are objects for processing may be events having particular event properties. For example, the events which are objects for processing may be a congestion event Ev1 and a delaying event Ev2 which have properties related to "driving speed change".

Figure 5:
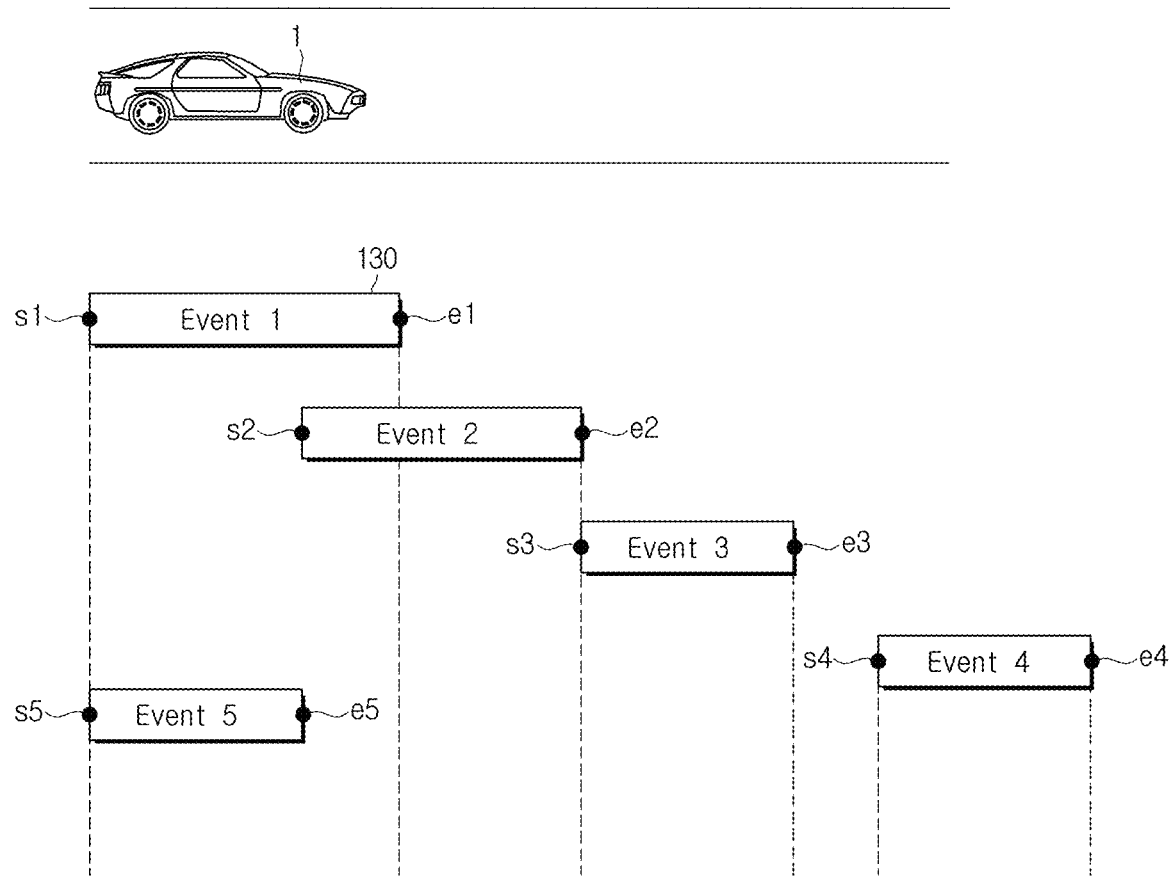
FIG. 5 is a view illustrating an example of the plurality of events which are objects for processing.

Also, the events which are objects for processing may be events overlapping other events or consecutive events of other events. FIG. 5 is a view illustrating an example of the plurality of events which are objects for processing.

Events overlapping other events include partial overlapping events with end points positioned after starting points of other events and starting points positioned before starting points of other events and events included in other events (that is, entirely-overlapping events). Consecutive events mean events with end points coinciding with starting points of other events.

Referring to FIG. 5, since an end point e1 of a first event Event1 is positioned after a starting point s2 of a second event Event2, a starting point s1 of the first event Event1 is positioned before a starting point s2 of the second event Event2, the first event Event1 and the second event Event2 are to be partially overlapping events which are objects for processing.

Also, since a starting point s5 and an end point e5 of a fifth event Event5 are included within a range between the starting point s1 and the end point e1 of the first event Event1 (including a case of having the same starting point and end point), the fifth event Event5 is an event included in the first event Event1.

Also, since an end point e2 of the second event Event2 and a starting point s3 of a third event Event3 coincide, the second event Event2 and the third event Event3 are consecutive events.

Meanwhile, since a fourth event Event4 does not overlap any one of the events Event1 to Event3, and Event5 or is not a consecutive event thereof, the fourth event Event4 is not an object for processing.

Also, the controller 140 generates an integrated event by integrating the events which are objects of processing and calculates a distance and an average speed of the integrated event. FIGS. 6 to 9 are concept views illustrating a method of calculating the distance and the average speed of the integrated event.

Figure 6:
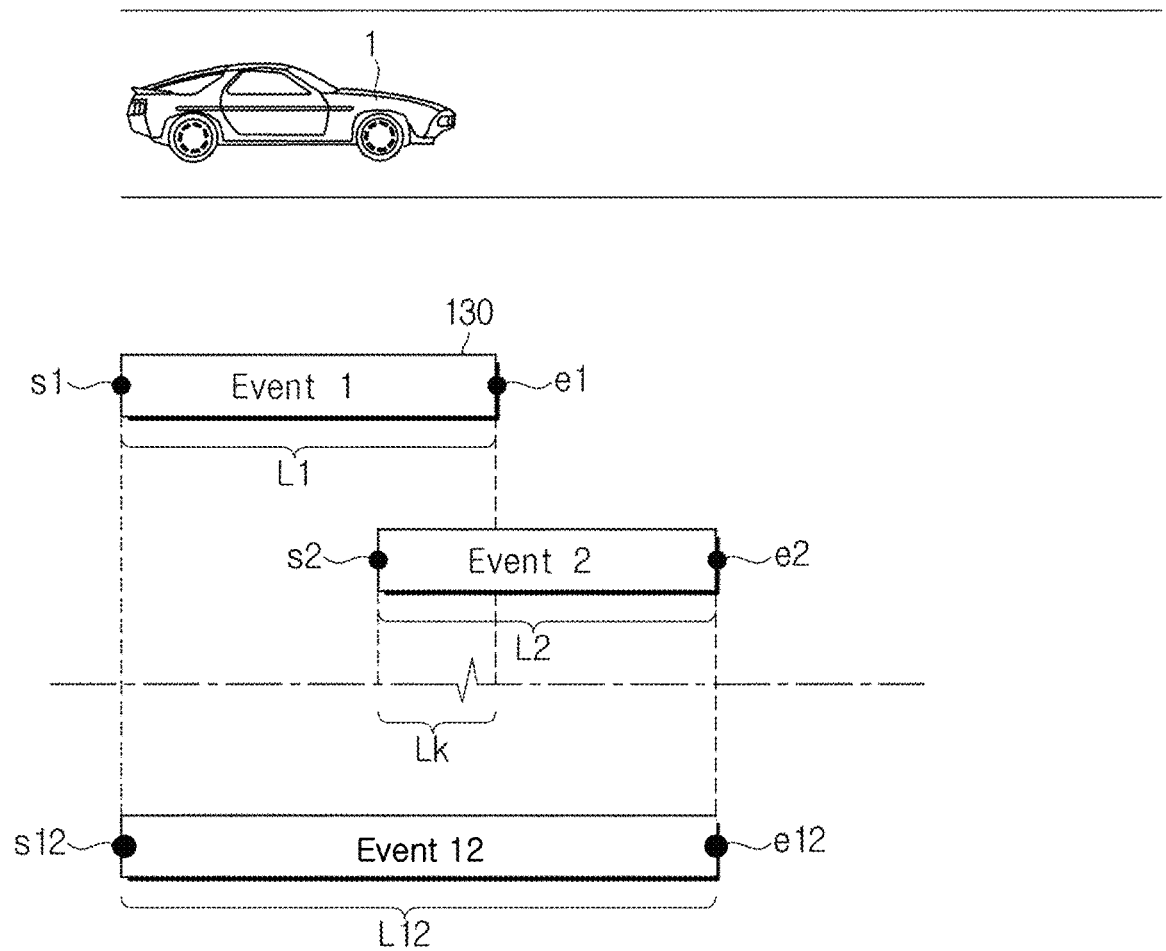
FIGS. 6 to 9 are concept views illustrating a method of calculating the distance and the average speed of the integrated event.

Referring to FIG. 6, when a plurality of events Event1 and Event2 are partially overlapping events, the controller 140 may convert the plurality of events, Event1 and Event2, into one integrated event Event12, set the starting point s1 of the event Event1 closer to the vehicle 1 and the end point e2 of the event Event2 farther from the vehicle 1 are set as a starting point s12 and an end point e12 of the integrated event Event12, and calculate a distance L12 between the starting point s12 and the end point e12 as a distance of the integrated event Event12.

Also, the controller 140 may calculate an average speed of the integrated event Event12 by summing average speeds of events with low average speeds (for example, the event Event2) in proportion to distances Lk of overlapping sections with respect to the overlapping sections and summing average speeds of the events Event1 and Event2 in proportion to distances L1-Lk and L2-Lk of non-overlapping sections of the events Event1 and Event2 for the non-overlapping sections. This may be shown in Equation 1 as follows.

$$Vt=((L1-Lk)*V1+(L2-Lk)*V2+Lk*V2)/(L1+L2) \quad \text{[Equation 1]}$$

Here, Vt indicates an average speed of an integrated event, L1 and V1 respectively indicate a distance and an average speed of an event with a higher average speed between the two partially overlapping events, L2 and V2 respectively indicate a distance and an average speed of events with lower average speeds among a plurality of events, and Lk indicates distances of overlapping sections.

In this case, the controller 140 may control the display 110 to display an icon implying that the integrated event Event12 has been generated by integrating two events Event1 and Event2.

Figure 7:
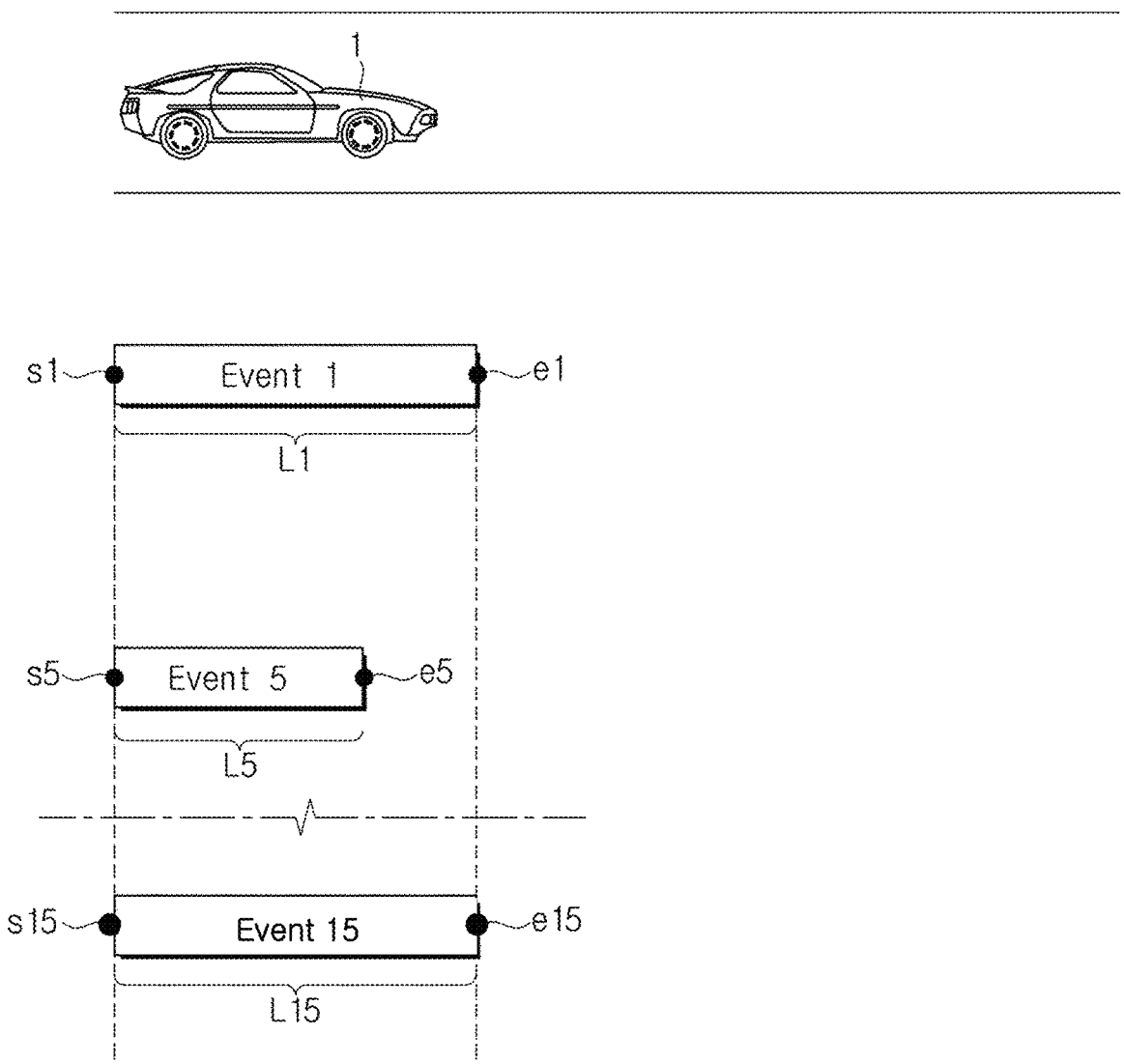

Also, referring to FIG. 7, when the event Event5 is included in the event Event1, the controller 140 may convert the plurality of such events Event1 and Event5 into one integrated event Event15, set the starting point s1 or s5 of the event Event1 or Event5 closer to the vehicle 1 and the end point e5 of the event Event5 farther from the vehicle 1 respectively as a starting point s15 and an end point e15 of the integrated event Event15, and calculate a distance L15 between the starting point s15 and the end point e15 as a distance of the integrated event Event15.

Also, when an average speed of the event Event1 having a longer distance is present (that is, the average speed is not 0), the controller 140 may calculate the average speed of the event Event1 with the longer distance to be the average speed of the integrated event Event15. However, when the average speed of the event Event1 having a longer distance is not present (that is, the average speed is 0), the controller 140 may calculate the average speed of the integrated event Event15 by summing an average speed of the event Event5 having a shorter distance in proportion to a distance L5 of an overlapping section for the overlapping section and a speed limit of a road link corresponding to a non-overlapping section in proportion to a distance L1-L5 of the non-overlapping section with the non-overlapping section. The speed limit of the road link may be a value prestored in the storage 120. It may be shown in Equation 2 as follows.

$$Vt=V1(V1 \neq 0)$$

$$Vt=(Ve(L1-L5)+V2*L5)/(L1+L5)(V1=0) \quad \text{[Equation 2]}$$

Here, Vt indicates an average speed of an integrated event, L1 and V1 respectively indicate a distance and an average speed of an event with a longer distance, L5 and V5 respectively indicate a distance and an average speed of an event with a shorter distance, and Ve indicates a speed limit of a road link corresponding to an overlapping section.

When the display 110 displays the integrated event Event15, the controller 140 may control the display 110 to display the same icon as the event Event1 having a longer distance.

Figure 8:
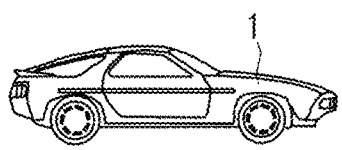
Figure 8:
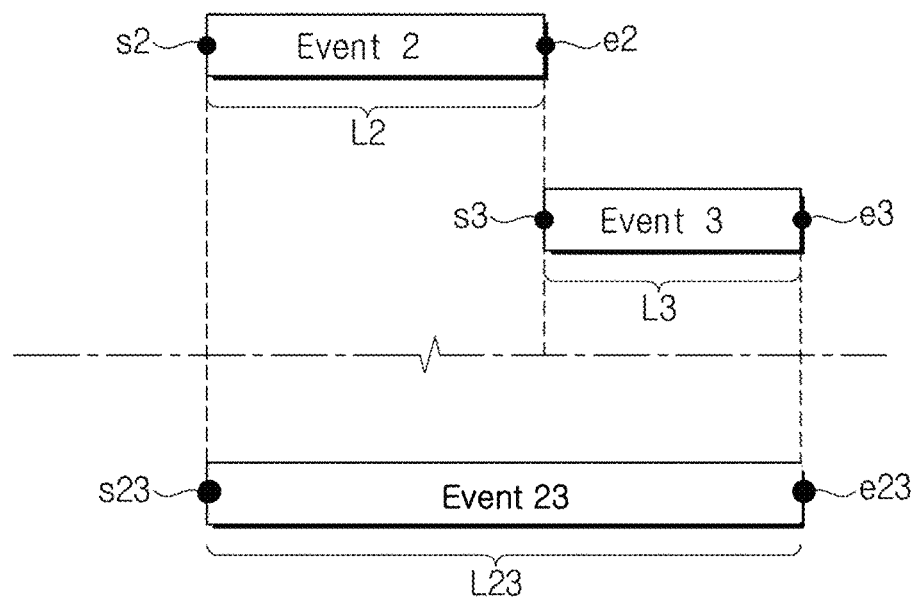

Also, referring to FIG. 8, when the events Event2 and Event3 are consecutive events, the controller 140 may convert a plurality of such events Event2 and Event3 into one integrated event Event23, set the starting point s2 of the event Event2 closer to the vehicle 1 and the end point e3 of the event Event3 farther from the vehicle 1 respectively as a starting point s23 and an end point e23 of the integrated event Event23, and calculate a distance L23 between the starting point s23 and the end point e23 as a distance of the integrated event Event23.

Also, the controller 140 may calculate an average speed of the integrated event Event23 by summing average speeds of the events Event2 and Event3 in proportion to distances L2 and L3 of the events Event2 and Event3. This may be shown in Equation 3 as follows.

$$Vt=(L2*V2+L3*V3)/(L2+L3) \quad \text{[Equation 3]}$$

Here, Vt indicates an average speed of an integrated event, L2 and V2 respectively indicate a distance and an average speed of one of a plurality of consecutive events, and L3 and V3 respectively indicate a distance and an average speed of others of the plurality of events.

In this case, the controller 140 may control the display 110 to display an icon implying that the integrated event Event23 has been generated by integrating two events Event2 and Event3.

Meanwhile, the number of the plurality of events which are objects for processing is not limited to two as shown in FIGS. 6 to 8 but may be three or more.

Figure 9:
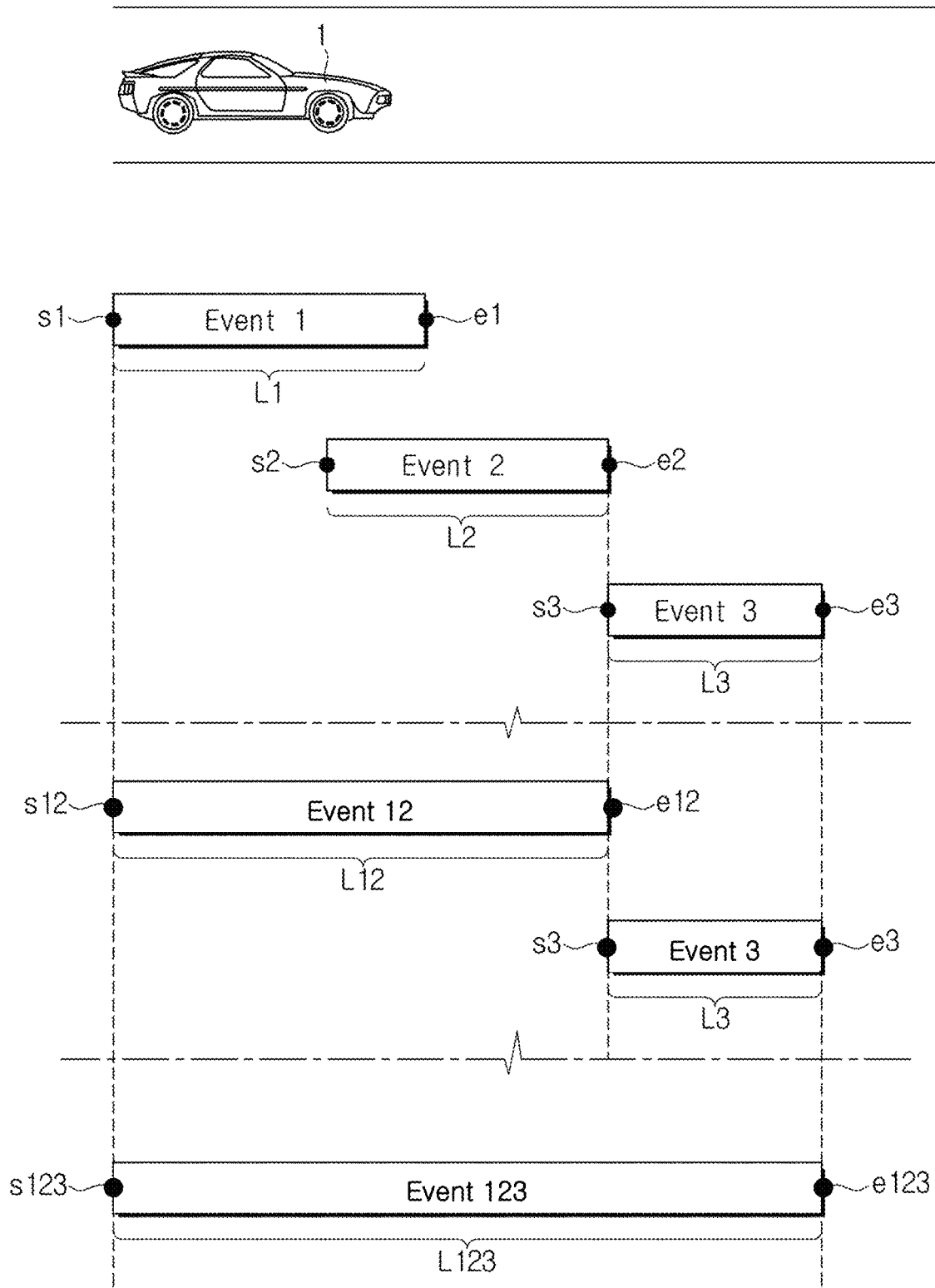

Referring to FIG. 9, the controller 140 may generate one integrated event by sequentially performing a process of integrating by pairing every two events of three or more events.

For example, when the first and second events Event1 and Event2 are partially overlapping events and the second and third events Event2 and Event3 are consecutive events, as described above with reference to FIG. 6, the controller 140 may respectively set the starting point s1 of the first event Event1 closer to the vehicle 1 and the end point e2 of the second event Event2 farther from the vehicle 1 to be the starting point s12 and the end point e12 of the integrated event Event12 and calculate a distance L12 between the starting point s12 and the end point e12 to be the distance of the integrated event Event12.

Also, the controller 140 may calculate an average speed of the first integrated event Event12 by summing an average speed of one of the first or second event Event1 or Event2 with a low average speed, for example, the event Event2 in proportion to a distance of an overlapping section between the first and second event Event1 and Event2 for the overlapping section and summing average speeds of the events Event1 and Event2 in proportion to distances of non-overlapping sections of the events for the non-overlapping sections.

Also, as described with reference to FIG. 8, since the first integrated event Event12 and the third event Event3 are consecutive events, the controller 140 may respectively set the starting point s12 of the first integrated event Event12 closer to the vehicle 1 and the end point e3 of the third event Event3 farther from the vehicle 1 to be a starting point s123 and an end point e123 of a second integrated event Event123 and calculate a distance L123 between the starting point s123 and the end point e123 to be a distance of the second integrated event Event123.

Also, the controller 140 may calculate an average speed of the second integrated event Event123 by summing average speeds of the first integrated event Event12 and event Event3 in proportion to the distances L12 and L3 of the events Event12 and Event3.

That is, the controller 140 may generate the second integrated event Event123 as a result by performing a process of integrating the three events Event1, Event2, and Event3 and calculating a distance and average speeds thereof and store the result in another data area in the storage 120.

Figure 10:
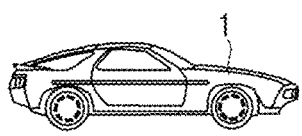
FIG. 10 is a view illustrating an example of events which are not objects for processing.
Figure 10:
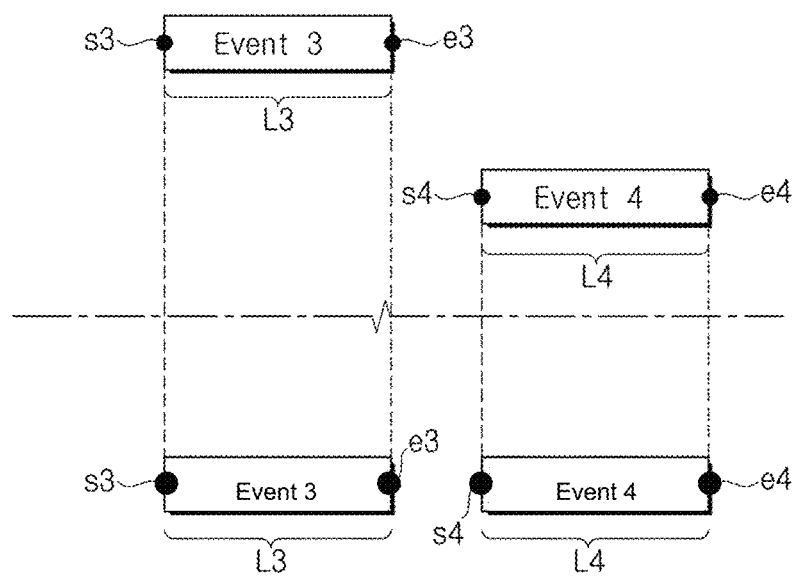

Meanwhile, the controller 140 does not perform the process described above on any events which are not objects for processing. FIG. 10 is a view illustrating an example of events which are not objects for processing.

Referring to FIG. 10, since the third event Event3 and the fourth event Event4 do not overlap and are not consecutive events, they are not determined as objects of processing.

In this case, the third event Event3 and the fourth event Event4 are not integrated and may be stored in another data are in the storage 120 while maintaining the distances L3 and L4 and the average speeds thereof.

The controller 140 may calculate a delayed driving time caused by each of the events based on the average speeds and distances of the events stored in another data area. The delayed driving time is proportional to a distance of an event and inversely proportional to an average speed.

Also, the controller 140 may control the display 110 to display an average speed, a distance, and a delayed driving time of an event, which have been calculated. Also, when performing a search for a path to perform a navigation function or an autonomous driving function of the vehicle 1, the controller 140 may search for an optimal path using a delayed driving time caused by each event.

At least one component may be added or deleted corresponding to performance of the components of the navigation apparatus 100 described above. Also, it would be easily understood by one of ordinary skill in the art that mutual positions of the components may be changed corresponding to performance and a structure of a system.

Meanwhile, each of the components described above may be a software component and/or a hardware component, such as a field-programmable gate array (FPGA) and an application-specific integrated circuit (ASIC).

Hereinafter, referring to FIG. 11, a method of controlling the navigation apparatus 100 in accordance with one embodiment will be described in detail. FIG. 11 is a flowchart of a method of controlling a navigation apparatus in accordance with one embodiment. Since the components of the navigation apparatus 100 which will be described with reference to FIG. 11 are identical to the components described above with reference to FIGS. 1 to 10, they will be referred by the same reference numerals.

First, the receiver 130 of the navigation apparatus 100 in accordance with one embodiment receives a plurality of events related to traffic information from outside such as a traffic control center, a server, or the like through a wireless communication network (1111).

Subsequently, the controller 140 of the navigation apparatus 100 which receives the events through the receiver 130 stores raw data of the plurality of events received by the receiver 130 in any one data area of the storage 120 and parses and decodes the raw data according to specifications of the navigation apparatus 100 (1112).

Subsequently, the controller 140 of the navigation apparatus 100 performs post-processing for transferring a plurality of such decoded events to another data area of the storage 120 of the navigation apparatus 100 (1113).

Subsequently, the controller 140 selects events which are objects for processing among the events stored in the other data area (1114). In this case, the controller 140 may select an event having preset event properties as an event which is an object for processing. Also, the controller 140 may select an event overlapping another event or consecutive events as the event which is an object of processing.

Subsequently, the controller 140 of the navigation apparatus 100 performs a process of processing the event which is an object of processing (1115). The process of processing the event may include an operation of integrating overlapping or consecutive events and calculating a distance and an average speed of an integrated event. Since the integrating of the events and the calculating of the distance and average speed have been described above, a repeated description thereof will be omitted.

Subsequently, the controller 140 generates an integrated event (1116) and stores the integrated event in the storage 120.

Figure 12:
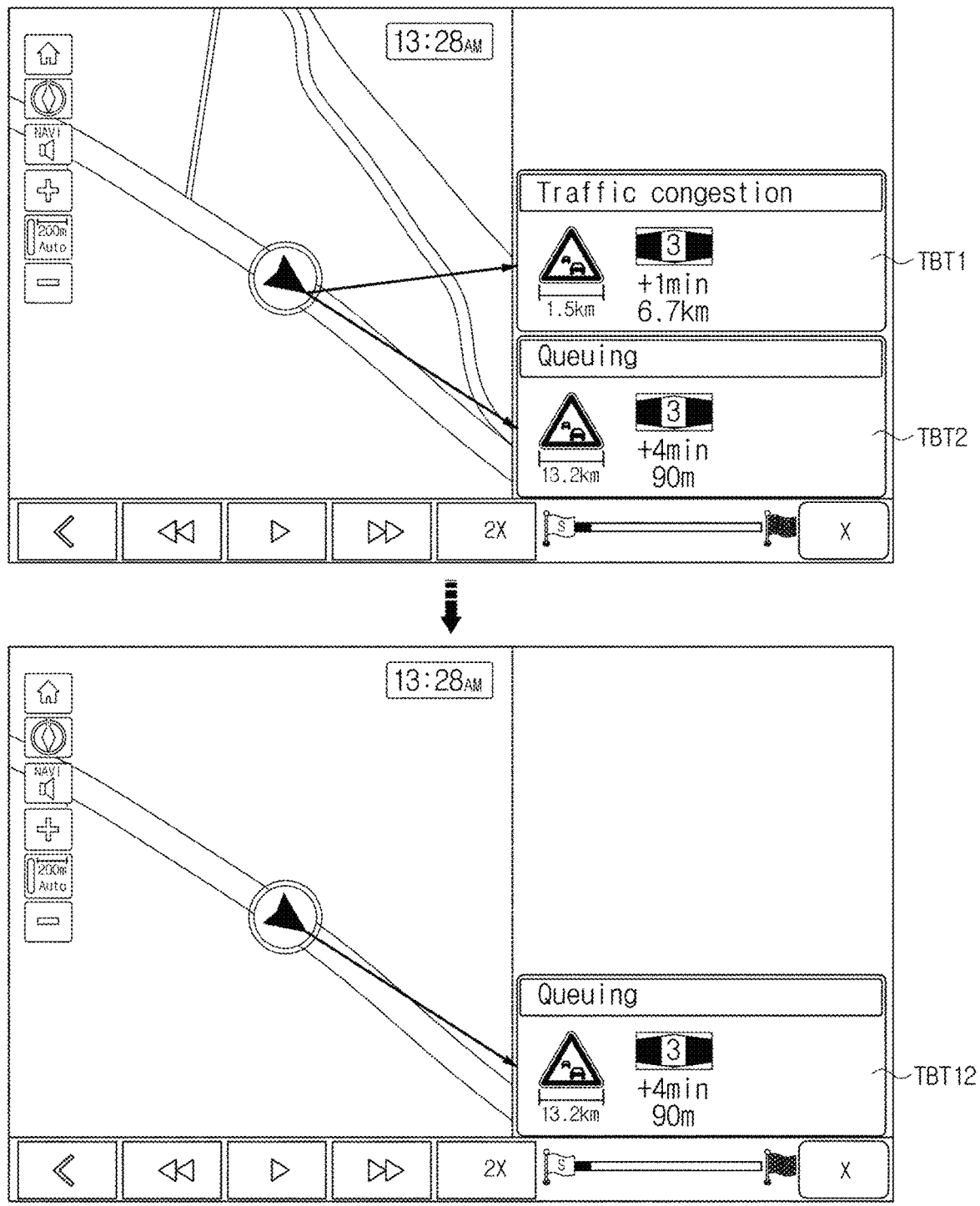
FIG. 12 is a view illustrating an example of one screen which shows the information with respect to the integrated event displayed on the display.

Meanwhile, information with respect to the integrated event may be displayed on the display 110. FIG. 12 is a view illustrating an example of one screen which shows the information with respect to the integrated event displayed on the display.

Referring to FIG. 12, even though an overlapping section (a section from 6.7 km from the vehicle 1 to a point 1.5 km therefrom) as shown in an upper end in the drawing exits, two events which are not processed by the controller 140 are displayed as two pieces of information such as TBT1 and TBT2 on the screen of the display 110.

However, in the case of the navigation apparatus 100 in accordance with one embodiment, since the two events are events including preset properties such as traffic congestion and queuing and include an overlapping section, it is possible to generate an integrated event. Accordingly, since only one piece of information TBT12 is displayed on the screen of the display 110, the user may easily recognize traffic conditions without difficulty.

As is apparent from the above description, a navigation apparatus, a vehicle including the same, and a method of controlling the vehicle may reasonably and usefully transfer complicated traffic conditions to a user by generating an integrated event.

Although embodiments of the present disclosure have been shown and described, it would be appreciated by those skilled in the art that changes may be made in these embodiments.

What is claimed is:
1. A navigation apparatus provided in a vehicle comprising:
a display;

a receiver configured to receive a plurality of events from an external server via a wireless communication, wherein each of the plurality of events is located on a section of a driving road and is traffic information of a corresponding section on the driving road including information about an event property, a length of the corresponding section, a starting point of the corresponding section, an end point of the corresponding section, and an expected driving speed of the corresponding section; and a controller configured to (i) determine multiple events from among the plurality of events based on the event property of each of the plurality of events and position of the corresponding section of each of the plurality of events, wherein each of the multiple events has a same event property and corresponding sections of the multiple events overlap with each other or are continuous, (ii) use the respective lengths, starting points, and expected driving speeds of the determined multiple events to combine the determined multiple events into a single integrated event having a single length, a single starting point, a single end point, and a single expected driving speed, and (iii) control the display to display the single integrated event.

2. The navigation apparatus of claim 1, wherein the plurality of events comprise a first event and a second event,
wherein when an end point of a first section corresponding to the first event coincides with a starting point of a second section corresponding to the second event, the controller determines that the first section corresponding to the first event and the second section corresponding to the second event are continuous.

3. The navigation apparatus of claim 1, wherein the plurality of events comprise a first event and a second event,
wherein when an end point of a first section corresponding to the first event is positioned after a starting point of a second section corresponding to the second event, the controller determines that the first section corresponding to the first event and the second section corresponding to the second event overlap each other.

4. The navigation apparatus of claim 1, wherein the plurality of events comprise a first event and a second event,
wherein when a first section corresponding to the first event is included in a second section corresponding to the second event, the controller determines that the entire first section corresponding to the first event overlaps the second section corresponding to the second event.

5. The navigation apparatus of claim 1, wherein when sections of each of the determined events are continuous, the controller determines the expected driving speed of the integrated event by summing expected driving speeds of the determined multiple events in proportion to length of each of the determined multiple events.

6. The navigation apparatus of claim 1, wherein when sections of each of the determined multiple events overlap, the controller determines the expected driving speed of the integrated event by summing expected driving speeds of the determined multiple events with low expected driving speeds among the determined multiple events, in proportion to a length of an overlapping section, for the overlapping section, and summing expected driving speeds of the determined multiple events in proportion to a length of a non-overlapping section of each of the determined multiple events, for the non-overlapping section of each of the determined multiple events.

7. The navigation apparatus of claim 4, wherein when the entire first section corresponding to the first event overlaps the second section corresponding to the second event, the controller determines an expected driving speed of the second event to be the expected driving speed of the integrated event.

8. The navigation apparatus of claim 4, further comprising a storage in which speed limit information for each link of the driving road is stored,
wherein when the entire first section corresponding to the first event overlaps the second section corresponding to the second event, the controller determines the expected driving speed of the integrated event by summing an expected driving speed of the first event in proportion to a length of an overlapping section of the second event, for the overlapping section, and the speed limit stored in the storage in proportion to a length of a non-overlapping section of the second event, for the non-overlapping section.

9. The navigation apparatus of claim 1, wherein when sections of each of the determined events are continuous, the controller determines a sum of lengths of the determined events as the length of the integrated event.

10. The navigation apparatus of claim 1, wherein the plurality of events comprise a first event and a second event, and
wherein when an end point of a first section corresponding to the first event is positioned after a starting point of a second section corresponding to the second event and a starting point of the first section corresponding to the first event is positioned before the starting point of the second section corresponding to the second event, the controller determines a length between the starting point of the first section corresponding to the first event to an end point of the second section corresponding to the second event as the length of the integrated event.

11. The navigation apparatus of claim 1, wherein the plurality of events comprise a first event and a second event,
wherein when a first section corresponding to the first event is included in a second section corresponding to the second event, the controller determines a length of the second event as the length of the integrated event.

12. The navigation apparatus of claim 1, wherein the controller determines a delayed driving time caused by the integrated event based on the expected driving speed of the integrated event and the length of the integrated event.

13. A vehicle comprising:
a display;
a receiver configured to receive a plurality of events from an external server via a wireless communication, wherein each of the plurality of events is located on a section of a driving road and is traffic information of a corresponding section on the driving road including information about an event property, a length of the corresponding section, a starting point of the corresponding section, an end point of the corresponding section and an expected driving speed of the corresponding section; and
a controller configured to (i) determine multiple events from among the plurality of events based on the event property of each of the plurality of events and position of the corresponding section of each of the plurality of events, wherein each of the multiple events has a same event property and corresponding sections of the multiple events overlap with each other or are continuous, (ii) use the respective lengths, starting points, and expected driving speeds of the determined multiple events to combine the determined multiple events into a single integrated event having a single length, a single starting point, a single end point, and a single expected driving speed, and (iii) control the display to display the single integrated event.

14. A method of controlling a vehicle comprising a display and a receiver, comprising:

controlling the receiver to receive a plurality of events from an external server via a wireless communication, wherein each of the plurality of events is located on a section of a driving road and is traffic information of a corresponding section on the driving road including information about an event property, a length of the corresponding section, a starting point of the corresponding section, an end point of the corresponding section, and an expected driving speed of the corresponding section;

determining multiple events from among the plurality of events based on the event property of each of the plurality of events and position of the corresponding section of each of the plurality of events, wherein each of the multiple events has a same event property and corresponding sections of the multiple events overlap with each other or are continuous;

using the respective lengths, starting points, and expected driving speeds of the determined multiple events to combine the determined multiple events into a single integrated event having a single length, a single starting point, a single end point, and a single expected driving speed; and controlling the display to display the single integrated event.

15. The method of claim 14, wherein when sections of the determined multiple events are continuous, combining the determined multiple events into the single integrated event comprises determining the single expected driving speed by summing expected driving speeds of the determined multiple events in proportion to the length of each of the determined multiple events.

16. The method of claim 15, wherein when sections of each of the determined multiple events overlap, combining the determined multiple events into the single integrated event comprises determining the single expected driving speed by summing expected driving speeds of the determined multiple events with low expected driving speeds among the determined multiple events, in proportion to a length of an overlapping section, for the overlapping section, and summing expected driving speeds of the determined multiple events in proportion to a distance of a non-overlapping section of each of the determined multiple events, for the non-overlapping section of each of the determined multiple events.

17. The method of claim 14, further comprising determining events having predetermined event properties among the plurality of events.

* * * * *